United States Patent
Campagnolo

[11] Patent Number: 5,997,104
[45] Date of Patent: Dec. 7, 1999

[54] DEVICE FOR ROTATABLY SUPPORTING A HUB OF A BICYCLE WHEEL

[75] Inventor: Valentino Campagnolo, Vicenza, Italy

[73] Assignee: Campagnolo S.r.l., Vicenza, Italy

[21] Appl. No.: 09/104,368

[22] Filed: Jun. 25, 1998

[30] Foreign Application Priority Data

Nov. 21, 1997 [IT] Italy .................................. T097A1021

[51] Int. Cl.⁶ .................................................. B60B 27/00
[52] U.S. Cl. ................................... 301/110.5; 301/110.6; 301/56; 301/59; 301/124.2; 384/545
[58] Field of Search ........................... 301/110.5, 110.6, 301/55, 56, 59, 64.7, 124.2; 384/545, 538

[56] References Cited

U.S. PATENT DOCUMENTS

| | | | |
|---|---|---|---|
| 726,103 | 4/1903 | Schacht | 301/110.5 |
| 766,302 | 8/1904 | White | 304/110.5 |
| 1,116,845 | 11/1914 | Rogers | 384/538 |
| 1,303,235 | 5/1919 | Benson | 301/110.5 |
| 1,457,311 | 6/1923 | Ludwig | 301/110.5 |
| 1,480,565 | 1/1924 | Mottlau | 301/110.5 |
| 1,518,411 | 12/1924 | Roe | 301/110.5 |
| 1,811,679 | 6/1931 | Volet | 301/538 |
| 2,049,972 | 8/1936 | Murden | 301/110.5 |
| 2,246,492 | 6/1941 | Aldridge | 301/110.5 |
| 2,277,727 | 3/1942 | Swanson | 301/110.5 |
| 3,807,820 | 4/1974 | Schuhmann | 384/538 |
| 3,816,013 | 6/1974 | Schuhmann | 384/538 |
| 4,424,981 | 1/1984 | Maxwell, III | 301/110.5 |
| 4,588,542 | 5/1986 | Pierce | 301/64.7 |
| 4,596,477 | 6/1986 | Lundgren | 384/538 |
| 4,810,040 | 3/1989 | Chi | 301/110.5 |
| 5,121,973 | 6/1992 | Phillips | 301/110.5 |
| 5,129,711 | 7/1992 | Chen | 301/110.5 |
| 5,246,275 | 9/1993 | Arredondo, Jr. | 301/64.7 |
| 5,257,855 | 11/1993 | Nagano | 301/110.5 |
| 5,384,085 | 1/1995 | Houser et al. | 264/313 |
| 5,460,254 | 10/1995 | Huang | 301/110.5 |
| 5,540,485 | 7/1996 | Enders | 301/64.7 |
| 5,549,396 | 8/1996 | Chiang | 384/545 |

FOREIGN PATENT DOCUMENTS

| | | | |
|---|---|---|---|
| 441219 | 8/1949 | Italy | 301/110.5 |
| 22842 | 10/1896 | United Kingdom | 301/110.5 |
| 8211 | 4/1914 | United Kingdom | 301/110.5 |
| 476967 | 12/1937 | United Kingdom | 301/110.5 |

*Primary Examiner*—D. Glenn Dayoan
*Assistant Examiner*—Long Bao Nguyen
*Attorney, Agent, or Firm*—Sughrue, Mion, Zinn, Macpeak & Seas, PLLC

[57] ABSTRACT

A device for rotatably supporting a hub of a bicycle wheel on a shaft comprises at least one annular element with an outer conical surface which is pressed between the outer surface of shaft and the inner conical surface of the inner ring of a rolling bearing.

7 Claims, 5 Drawing Sheets

DEVICE FOR ROTATABLY SUPPORTING A HUB OF A BICYCLE WHEEL

BACKGROUND OF THE INVENTION

The present invention relates to devices for rotatably supporting a hub of a bicycle wheel, of the type comprising a shaft arranged through the cavity of the hub, a pair of rolling bearings interposed between the outer surface of the shaft and the surface of the hub cavity, each bearing having an inner ring and an outer ring respectively secured to the shaft and the hub, and means for locking the bearings in the assembled condition.

SUMMARY OF THE INVENTION

The object of the present invention is that of providing a device of the above indicated type which has a simple and reliable structure and which can be assembled with simple and rapid operations.

In view of achieving this object, the invention provides a device of the above indicated type, characterized in that the above mentioned locking means includes at least one annular element having an outer conical surface, interposed between the outer surface of the shaft and the inner ring of one of the rolling bearings, the inner ring of said bearing having an inner surface which is at least partially conical, in contact with the outer conical surface of said annular element, means being further provided for axially pressing the conical annular element between the shaft and said bearing up to an operative position in which the inner ring of the bearing is stably secured in rotation to the shaft, said means also being adapted to lock the conical annular element in this operative position.

In a first embodiment, which is provided with a metal shaft, e.g. of light alloy, said conical annular element is axially pressed towards its operative position by means of a ring nut which is screwed on a threaded end portion of the shaft.

In a second embodiment, said end portion of the shaft is smooth (i.e. with no thread) and the annular element is pressed axially by means of an annular clamp which can slide on the shaft. Both the ring nut of the first embodiment and the annular clamp of the second embodiment are splitted and have a tangential clamping screw for respectively locking the ring nut and the annular clamp on the shaft in the said operative position.

Said second embodiment is particularly adapted to the case in which the shaft is made of composite material and therefore is not suitable for forming a thread on its end portion. Moreover, in this case the shaft has a regular cylindrical shape, so that both bearings supporting the hub are provided with a conical annular locking element of the above described type. In the case instead in which the shaft is made of metal material, the inner ring of one of the two bearings can be pushed in contact with a conical surface formed directly on one end of the shaft, whereas the opposite bearing is provided with the conical annular element which has been described above.

BRIEF DESCRIPTION OF THE INVENTION

Further features and advantages of the invention will become apparent from the description which follows with reference to the annexed drawings, given purely by way of non limiting example, in which:

FIG. 1 is a cross-sectional view of a first embodiment of the device according to the invention, FIG. 2 is a view at an enlarged scale of a detail of FIG. 1, FIG. 3 is an exploded perspective view of the device of FIG. 1, FIG. 4 is a cross-sectional view of a second embodiment of the invention, and FIG. 5 is an exploded perspective view of the device of FIG. 4.

DETAILED DESCRIPTION OF THE INVENTION

Figure 1:
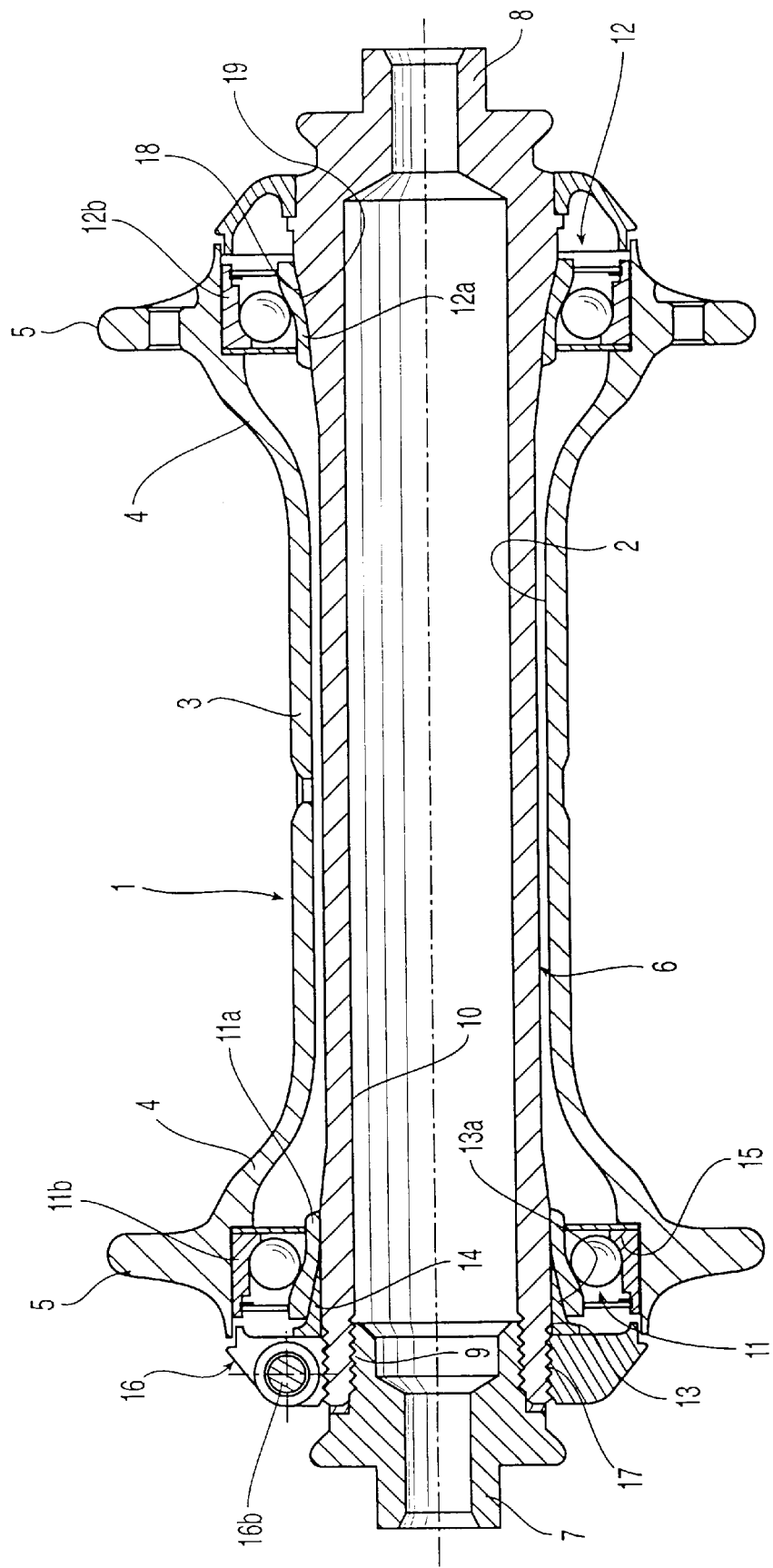
Figure 2:
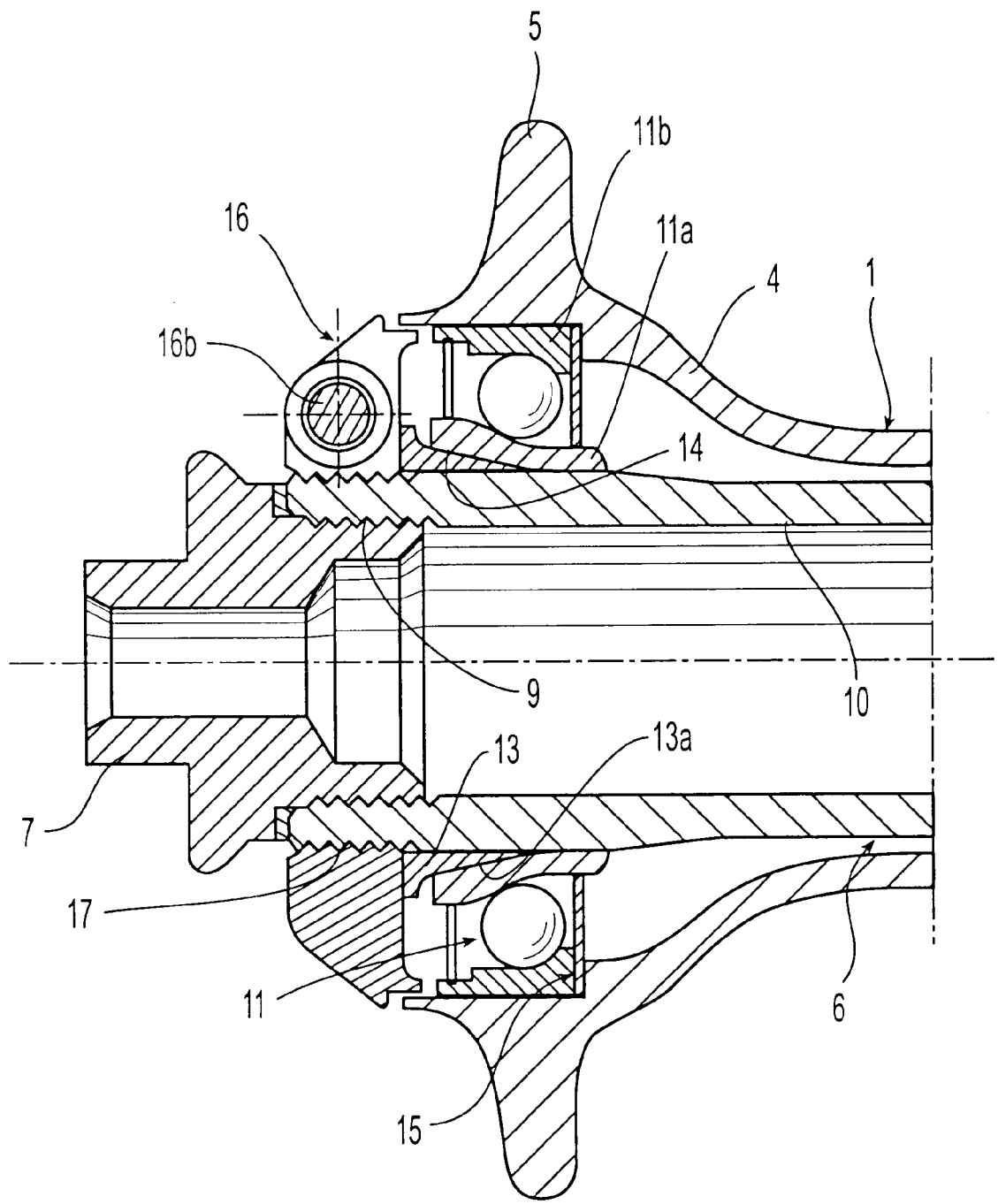
Figure 3:
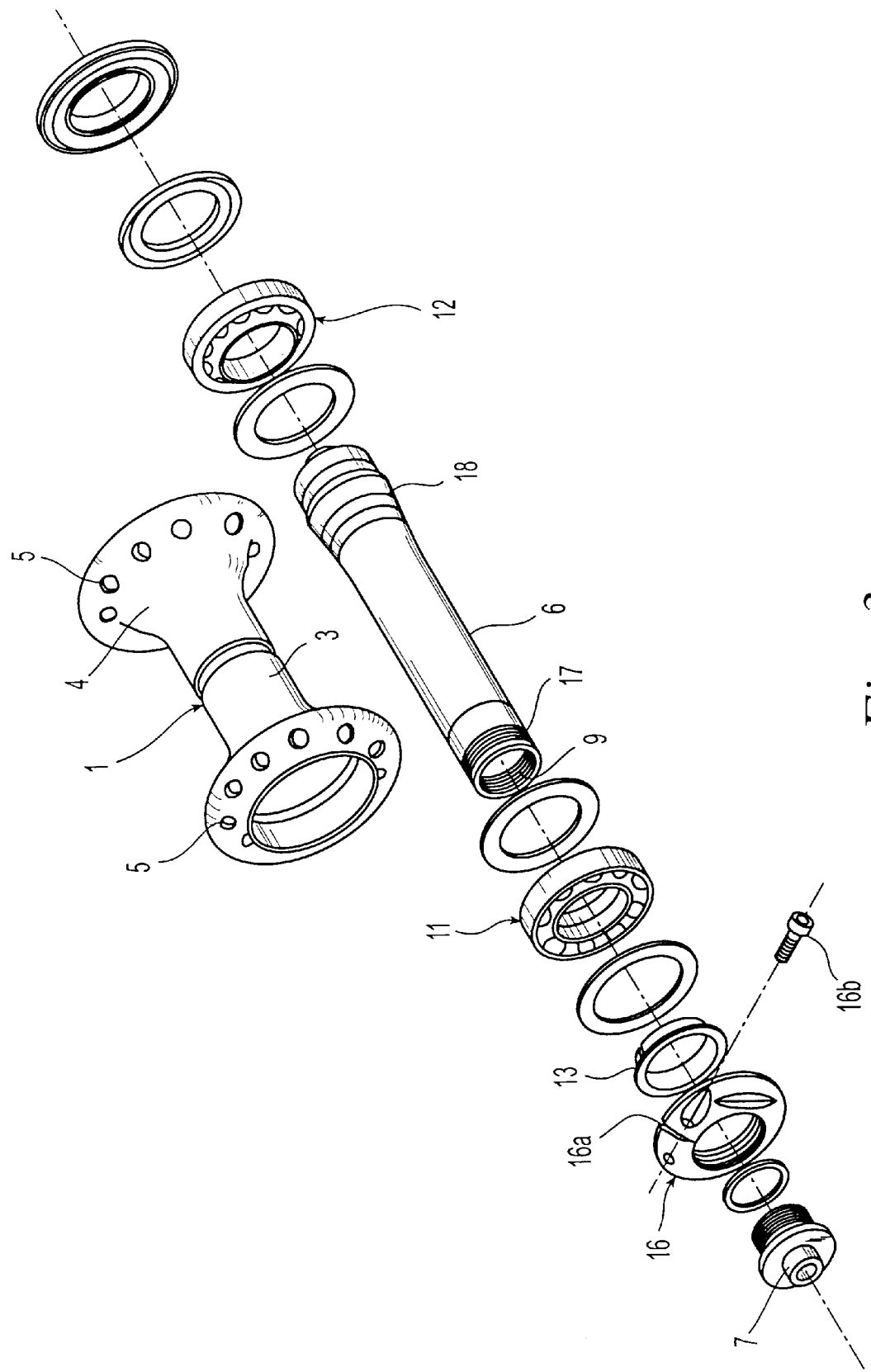

With reference to FIGS. 1–3, reference numeral 1 generally designates a bicycle wheel hub, comprising a body of metal material, such as light alloy, having a tubular shape defining an axial cavity 2. In the illustrated example, the body of the hub 1 has a central part 3 having a cylindrical shape, of constant diameter, and two bell-shaped enlarged end portions 4 having annular flanges 5 which are used for securing the radially inner ends of the spokes of the bicycle wheel.

The hub 1 is rotatably supported on a shaft 6, which also made of metal material, and is to be secured at its ends to a bicycle fork. To this end, in the illustrated example, the shaft 6 has two semi-axles 7, 8 at its ends, semi-axle 8 being formed in one piece with shaft 6 and semi-axle 7 being a separate element screwed within a threaded end portion 9 of the inner cylindrical cavity 10 of shaft 6.

The hub 1 is rotatably supported on the shaft 6 by means of two rolling bearings 11, 12, which in the illustrated example are two ball bearings able to transmit both axial forces and radial forces exchanged between the hub 1 and shaft 6. The two bearings 11, 12 have inner rings 11a, 12a rotatably connected to shaft 6 and outer rings 11b, 12b rotatably connected to hub 1.

According to the invention, assembling of the above described unit is obtained by inserting an annular element 13, having an outer conical surface 13a and an inner cylindrical surface between the shaft 6 and the inner ring 11a of bearing 11. To this end, the inner surface of the inner ring 11a has a conical portion 14 which is in contact with the outer conical surface 13a of the annular element 13. The latter is axially pushed rightwardly (with reference to FIG. 1) until it reaches an operative position in which it secures the inner ring 11a of bearing 11 in rotation on shaft 6. At the same time, the outer ring 11b is locked against an annular shoulder 15 formed in the surface of the hub cavity 2.

The conical annular element 13 is axially pushed towards it final operative position, in which the bearing 11 is restrained in the assembling condition, by a ring nut 16 which is screwed on an outwardly threaded end portion 17 of shaft 6.

At the opposite end of shaft 6, the latter has a portion 18 having a conical surface cooperating with a corresponding conical surface portion 19 formed on the inner surface of the inner ring 12a of bearing 12. When the conical annular element 13 is pushed up to its operative position, i.e. rightwardly with reference to FIG. 1, the axial force imparted to bearing 11 is transmitted by hub 1 to bearing 12, so that the inner ring 12a of the latter engages on the conical surface 18 of shaft 6, thus providing a safe clamping also for bearing 12.

When ring nut 16 is screwed until it pushes the conical annular element 13 to its operative position, it can be locked in this position. To this end, the ring nut 16 has a slot 16a and is provided with a clamping tangential screw 16b which can be tightened to lock the ring nut 16 by friction in the reached position. Naturally, instead of this arrangement, it is possible to adopt any other clamping and locking means, such as a ring nut with an additional lock nut or a self-locking ring nut.

Figure 4:
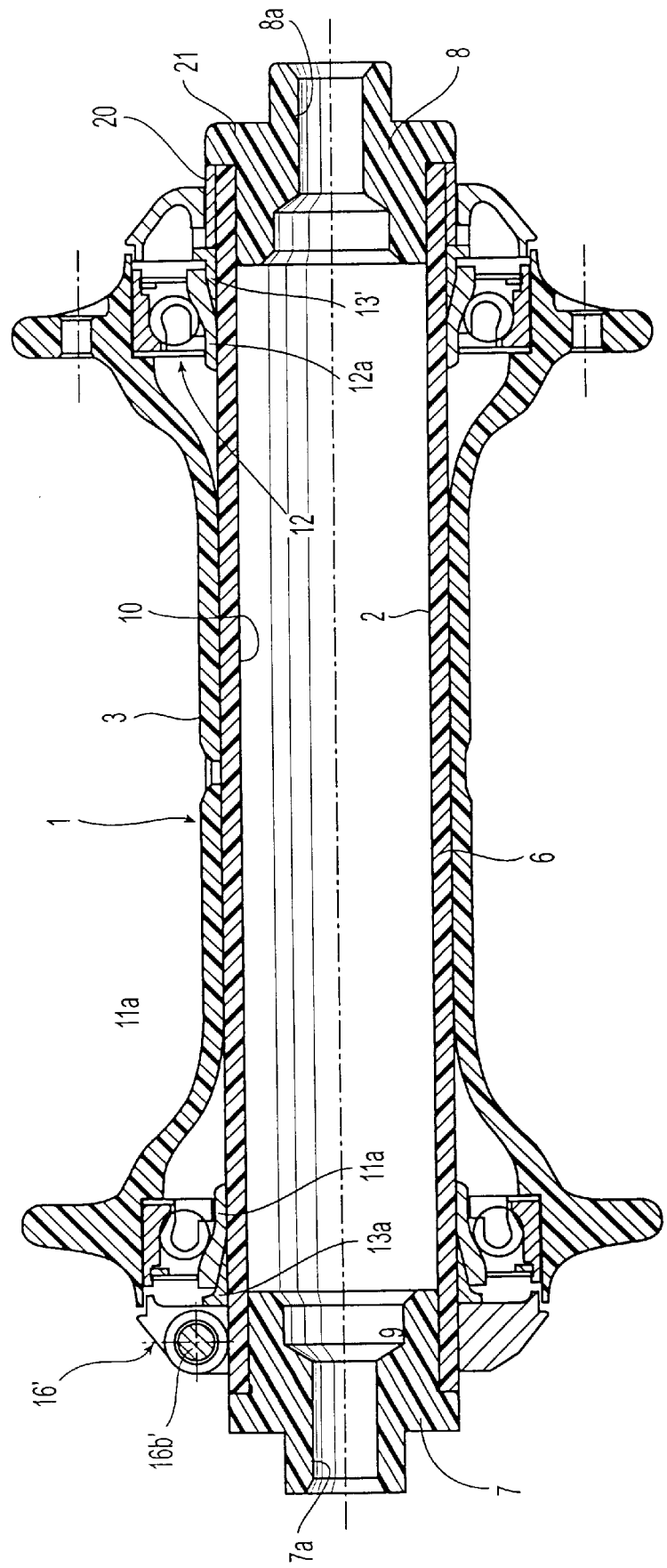
Figure 5:
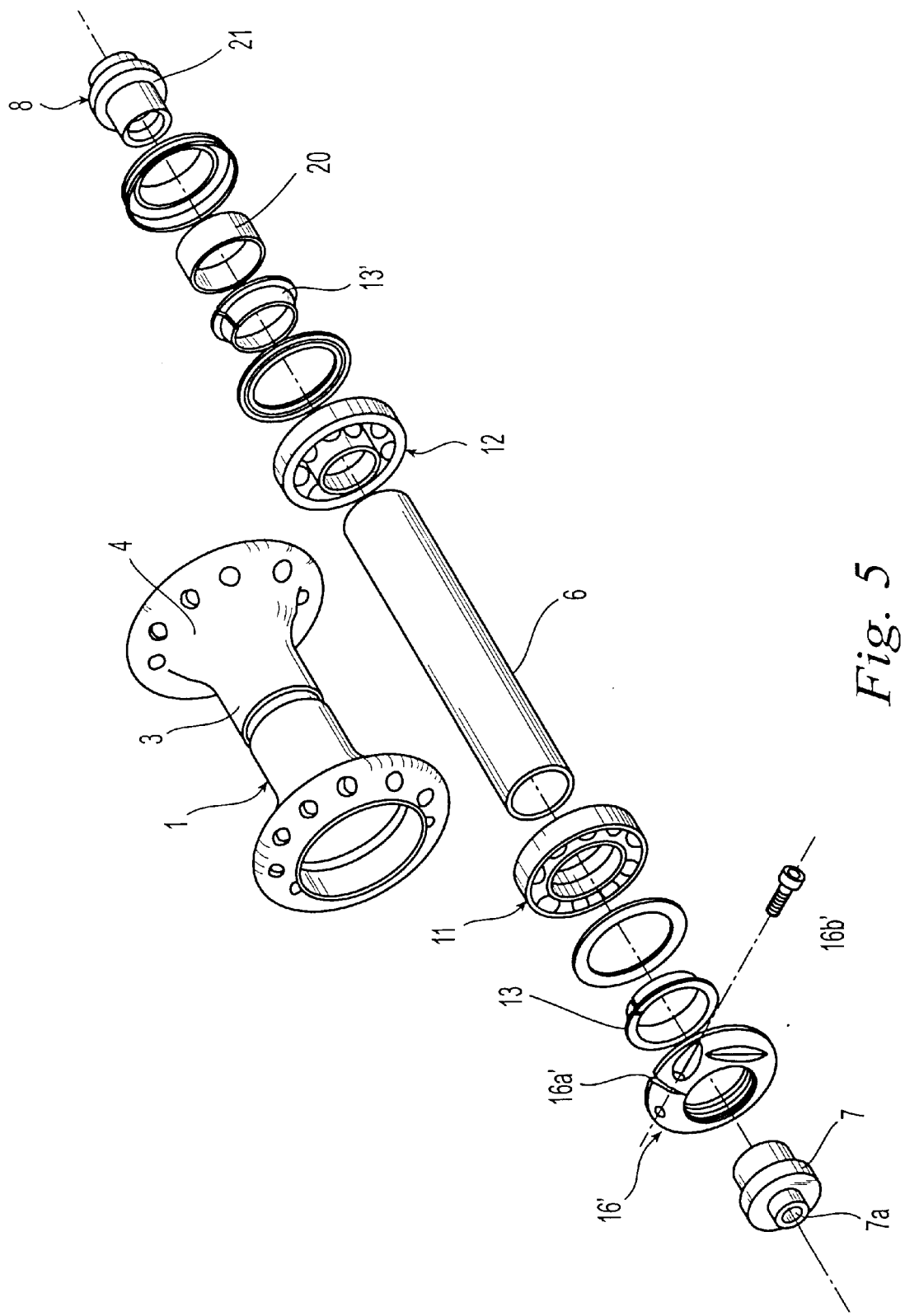

FIGS. 4, 5 show a variant which relates to the case in which shaft 6 has a regular cylindrical body made of composite material, such as carbonfibre material, having no outer threads of the type of thread 17, since this working cannot be carried out on a material of this type. In this case, both bearings 11, 12 are clamped by means of respective conical annular elements 13, 13'. Furthermore, in this case, again because the shaft 6 must have a regular cylindrical shape, both semi-axles 7, 8 are constituted by elements separate from shaft 6, which are glued within the end portions of the inner cavity 10 of shaft 6. In this case, moreover, since the outer surface of shaft 6 cannot have any threads, the conical annular element 13 is pushed towards its operative position by an annular clamp 16' which, similarly to ring nut 16 of the previously described embodiment, has a slot 16'*a* and a clamping screw 16'*b* which can be tightened to lock the annular clamp 16' by friction on shaft 6. When the clamp 16' pushes the annular element 13 towards its operative position, the bearing 11 is locked similarly to what has been described with reference to FIG. 1, whereas bearing 12 is locked because its inner ring 12*a* is pushed on the conical annular element 131 which is axially restrained by means of as spacer sleeve 20 by an annular flange 21 of semi-axle 8 which projects beyond the outer diameter of shaft 6.

The pressure to be applied to the annular clamp 16' for locking the unit in the assembled condition can be exerted for instance by means of a tool which includes a screw which is arranged throughout the whole extension of the inner cavity 10 of shaft 6 and the through central holes 8*a* and 7*a* of semi-axles 8, 7. This screw is provided with a head adapted to abut against the semi-axle 8 and threadily receives a ring nut adapted to exert a force on the annular clamp 16'. The above described tool is not shown however in the annexed drawings since, taken alone, it does not form part of the present invention and because it is possible to assemble the clamp 16' in any other way, as it will be readily apparent to the skilled men in the art.

In the case of the embodiment shown in FIGS. 4, 5, the hub 1 has a central portion 3 having an inner diameter slightly greater than the outer diameter of shaft 6, in order to provide an adequate support to this shaft, preventing an excessive bending thereof.

However, naturally, while the principle of the invention remains the same, the details of construction and the embodiments may widely vary with respect to what has been described and illustrated purely by way of example, without departing from the scope of the present invention.

What is claimed is:

1. A device for rotatably supporting a hub of a bicycle wheel, comprising:

a shaft arranged through a cavity of the hub, a pair of rolling bearings interposed between an outer surface of the shaft and a surface of the cavity of the hub, each bearing comprising an inner ring and an outer ring respectively secured to the shaft and the hub, and means for locking said bearings in the assembled condition, wherein said means include at least one annular element having an outer conical surface interposed between the outer surface of shaft and the inner ring of one of said bearings, the inner ring of this bearing having an inner surface at least partially conical in contact with the conical surface of said conical annular element, means being provided for axially pushing the conical annular element between the shaft and the bearing towards an operative position in which it stably secures the inner ring of said bearing in rotation on said shaft, said means being further adapted to lock said conical annular element in said operative position.

2. A device according to claim 1, wherein said means for axially pushing the conical annular element comprises an inwardly threaded ring nut screwed on a threaded end portion of the shaft and provided with means for locking thereof on the shaft.

3. A device according to claim 1, wherein said means for axially pushing the conical annular element comprises an annular clamp slidably mounted on a non-threaded end portion of the shaft and provided with means for locking thereof on the shaft.

4. A device according to claim 1, wherein a single conical annular element is used with one bearing, the other bearing being locked on a portion of the shaft having a conical surface and formed directly on the shaft.

5. A device according to claim 1, wherein the shaft has a regular cylindrical shape and in that there are provided two conical annular elements to be used with the two bearings, one of these conical elements being directly subjected to the force imparted by said pressing means, the other conical annular element abutting against a stop element connected to the shaft.

6. A device according to claim 1, wherein the shaft is of metal material.

7. A device according to claim 1, wherein the shaft is of composite material.

* * * * *